United States Patent [19]

Tetz et al.

[11] Patent Number: 5,800,111
[45] Date of Patent: Sep. 1, 1998

[54] COMPACTION MECHANISM FOR A COMPACTION CHAMBER OF A GARBAGE TRUCK

[76] Inventors: Warren Tetz, 4520=103A Avenue; Lam Chi Luong, 11621-81 Street, both of Edmonton, Alberta, Canada, T6A 0W3; Norman Laverne Heaman, 11 Meadow Crescent, Edmonton, Alberta, Canada, T6C 1G1

[21] Appl. No.: 768,181

[22] Filed: Dec. 18, 1996

[51] Int. Cl.$^6$ ............................................. B60P 1/00
[52] U.S. Cl. ...................... 414/515; 100/278; 414/525.6; 414/513
[58] Field of Search ................... 414/492, 493, 414/494, 509, 510, 511, 512, 513, 514, 515, 516, 517, 521, 525.1, 525.2, 525.3, 525.6; 198/478; 100/100, 278; 277/135; 254/283

[56] References Cited

U.S. PATENT DOCUMENTS

| | | | |
|---|---|---|---|
| 2,726,776 | 12/1955 | Myers | 414/513 |
| 2,909,295 | 10/1959 | Weir | 414/515 |
| 3,211,308 | 10/1965 | Glass | 414/516 |
| 4,004,703 | 1/1977 | Johnson, Jr. | 100/278 X |
| 4,578,015 | 3/1986 | Baldarelli et al. | 414/516 X |
| 5,193,453 | 3/1993 | Lundy | 414/514 X |

FOREIGN PATENT DOCUMENTS

| | | | |
|---|---|---|---|
| 274804 | 1/1990 | German Dem. Rep. | 414/509 |
| 2536391 | 2/1977 | Germany | 414/515 |
| 1258770 | 9/1986 | U.S.S.R. | |
| 760130 | 10/1956 | United Kingdom | 414/515 |

*Primary Examiner*—Frank E. Werner
*Attorney, Agent, or Firm*—Anthony R. Lambert

[57] ABSTRACT

A compaction mechanism uses cables to move a compaction plate within a compaction chamber of a garbage truck. Cable guide pulleys are positioned adjacent a first end and a second end of the compaction chamber. Each cable has a first end and a second end, both of which are secured to the compaction plate. A winch-like drive assembly is used to concurrently move the cables to pull the compaction plate. This compaction mechanism is better able to withstand uneven resistance on the compaction plate without twisting.

6 Claims, 4 Drawing Sheets

1

COMPACTION MECHANISM FOR A COMPACTION CHAMBER OF A GARBAGE TRUCK

FIELD OF THE INVENTION

The present invention relates to a compaction mechanism for a compaction chamber of a garbage truck.

BACKGROUND OF THE INVENTION

A garbage truck has a compaction chamber into which waste is received. A compaction mechanism is provided which includes a compaction plate positioned transversely across the compaction chamber. The compaction plate is moved by a large multi-stage telescopic hydraulic cylinder to compress waste.

Unfortunately, the above described compaction mechanism tends to be a high maintenance area in garbage trucks. The waste in the compaction chamber always provides resistance to the compaction force exerted by the compaction plate. If this resistance is sufficiently strong and acts unevenly upon the compaction plate, a twisting of the compaction plate will occur. As a result of this twisting the compaction plate can become jammed at an angle across the compaction chamber.

SUMMARY OF THE INVENTION

What is required is a compaction mechanism for a compaction chamber of a garbage truck that is better able to withstand uneven resistance on the compaction plate.

According to the present invention there is provided a compaction mechanism for a compaction chamber of a garbage truck which includes a compaction chamber having a first end and a second end. Cable guide means are positioned adjacent each of the first end and the second end of the compaction chamber. A compaction plate is disposed transversely across the compaction chamber. At least two cables and, preferably four extend between the cable guide means at first end and the cable guide means at the second end of the compaction chamber. Each of the cables has a first end and a second end, both of which are secured to the compaction plate. The cables are secured in a symmetrical pattern whereby each cable provides an substantially equal pulling force upon the compaction plate. Drive means are provided for concurrently moving the cables to pull the compaction plate toward one of the first end and the second end of the compaction chamber.

The compaction mechanism, as described above, is better able to withstand uneven resistance on the compaction plate. Of course, an embodiment using four cables would be less susceptible to having the compaction plate twist than an embodiment with two cables. The compaction mechanism also provides some secondary benefits. When hydraulic cylinders are used they move at a steady rate determined by the hydraulic cylinders capacity and the number of stages in the hydraulic cylinder. When a winch type of drive is used to provide a motive force to the cables, the speed may be varied. A common problem with hydraulic cylinders is leakage of hydraulic fluid. The leakage of hydraulic fluid presents a fire hazard. This problem is completely eliminated with the present invention.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
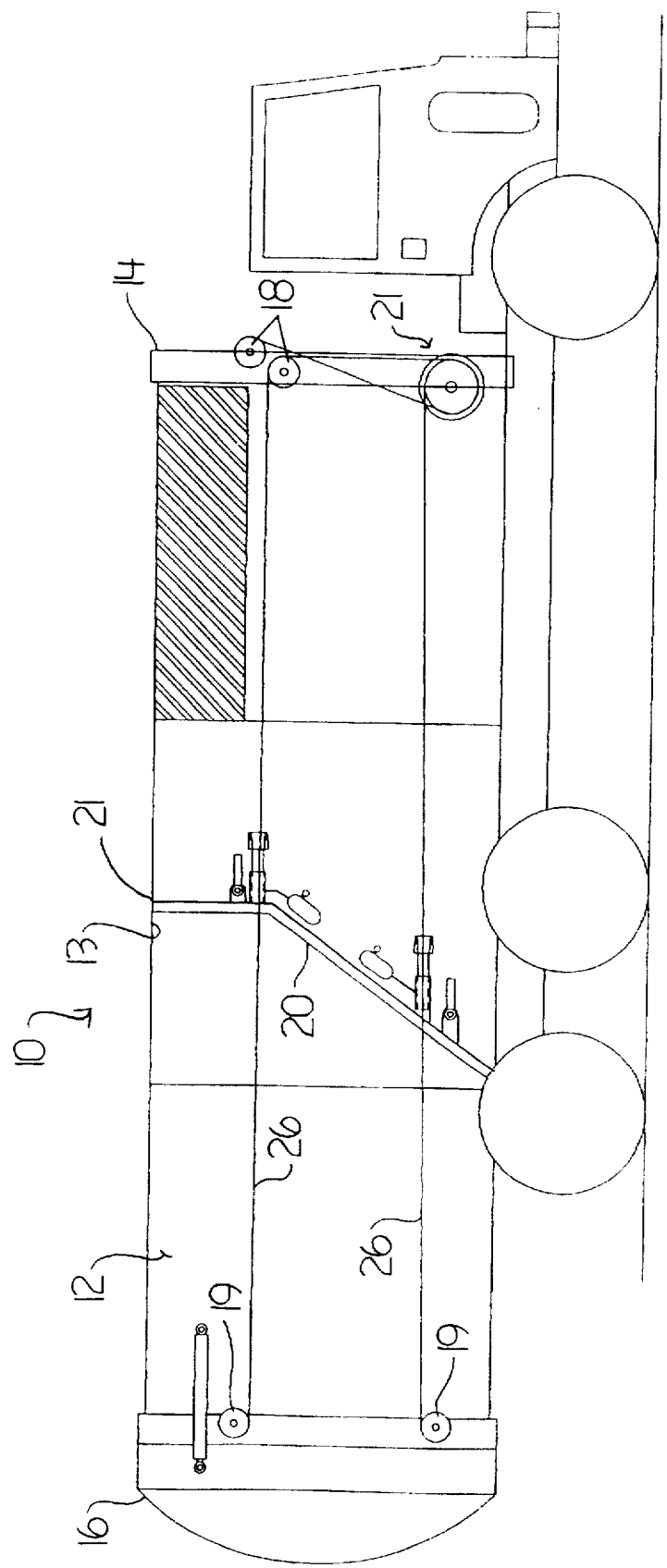
FIG. 1 is a side elevation view of a compaction mechanism constructed in accordance with the teachings of the present invention.

The preferred embodiment, a compaction mechanism for a garbage truck generally identified by reference numeral 10, will now be described with reference to FIGS. 1 through 4.

Figure 2:
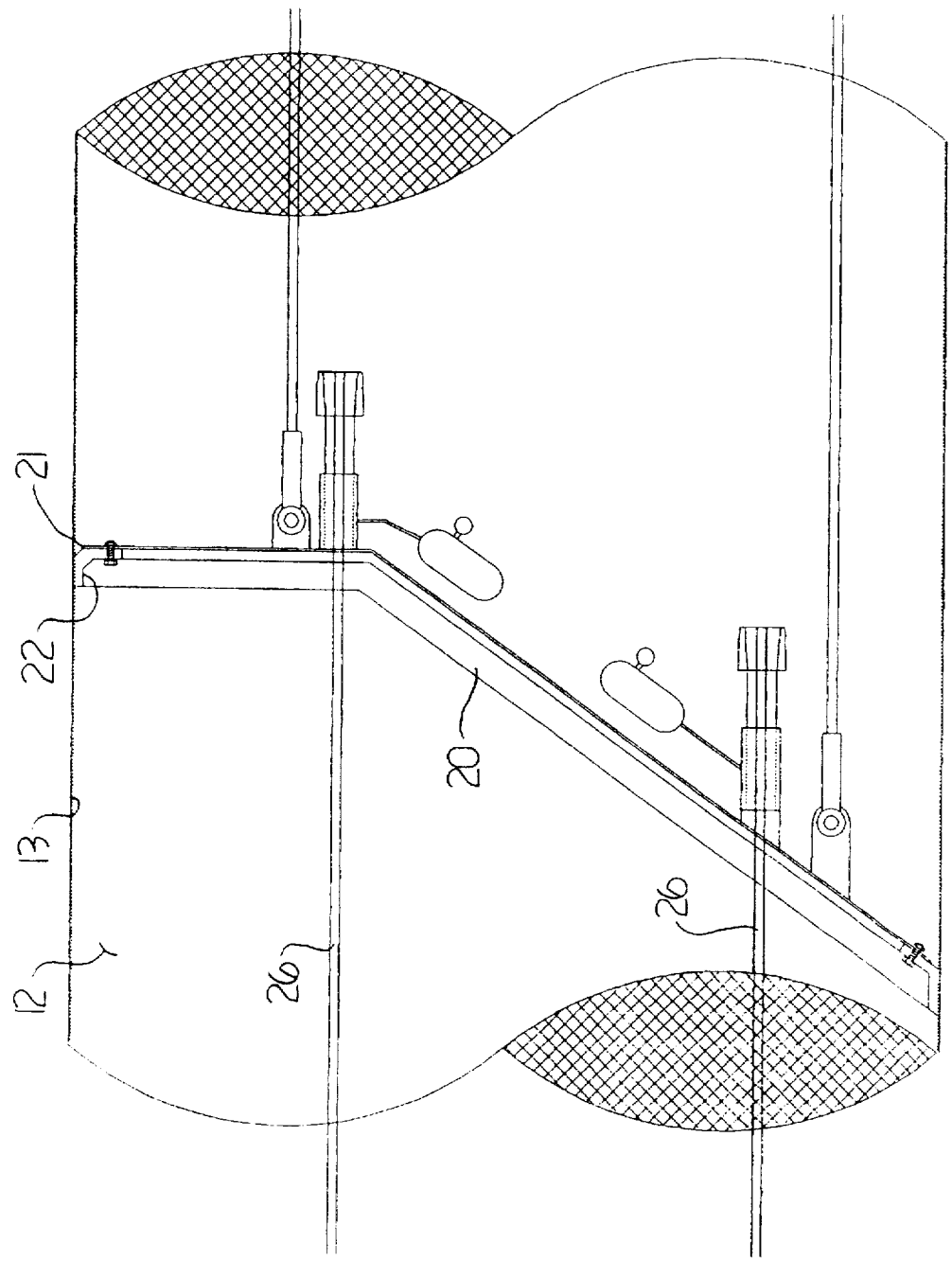
FIG. 2 is a detailed side elevation view of a compaction plate of the compaction mechanism illustrated in FIG. 1.
Figure 3:
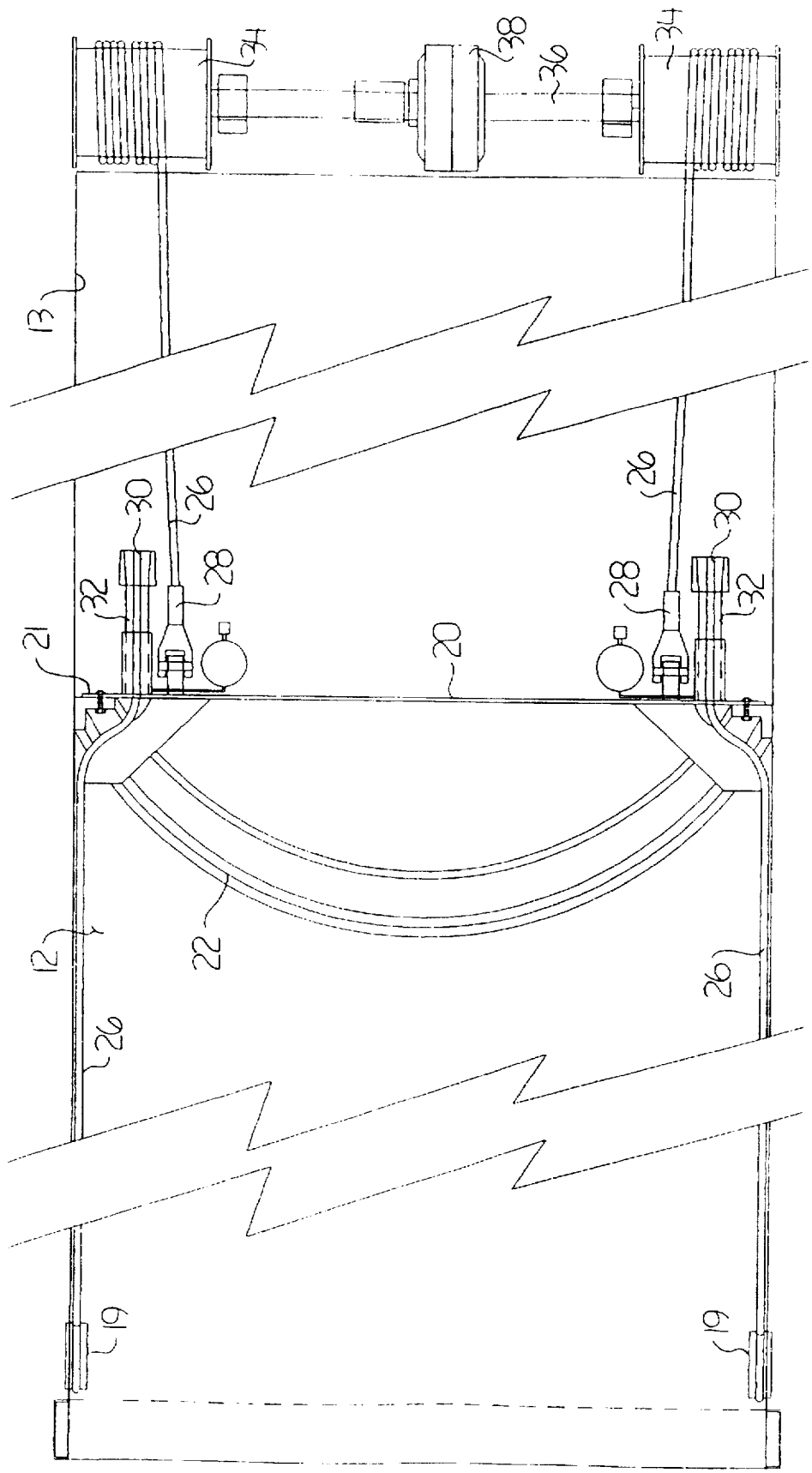
FIG. 3 is a top plan view of the compaction mechanism illustrated in FIG. 1.
Figure 4:
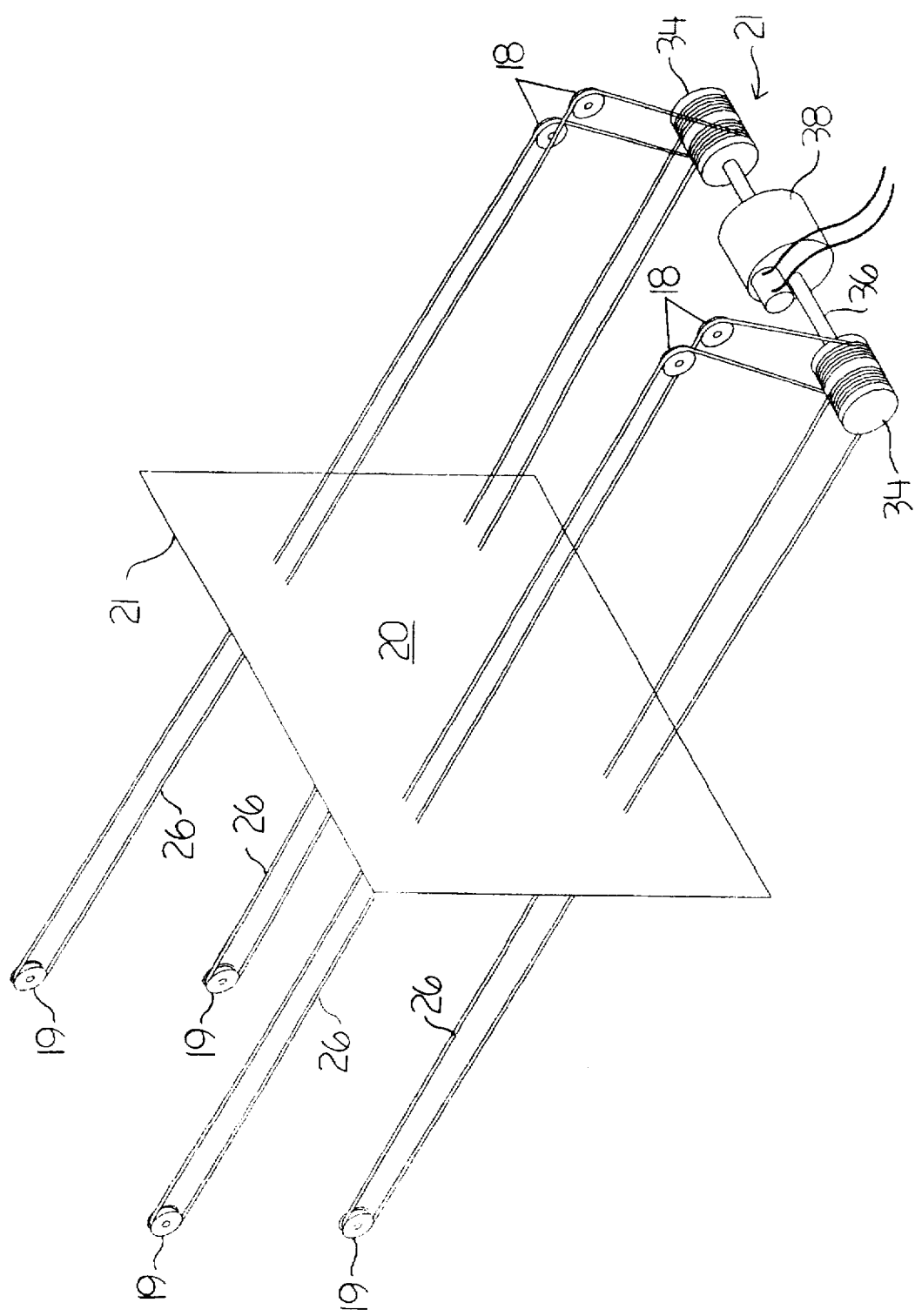
FIG. 4 is a detailed perspective view of a cable drive system for the compaction mechanism illustrated in FIG. 1.

Referring to FIG. 1, compaction mechanism 10 includes a generally cylindrical compaction chamber 12 having a peripheral wall 13 a first end 14 and a second end 16. Cable guide pulleys 18 are positioned adjacent first end 14. Cable guide pulleys 19 are positioned adjacent second end 16. A cable drive assembly 21 is positioned adjacent first end 14, the operation of which will be hereinafter further described. A compaction plate 20 is disposed transversely across compaction chamber 12. Referring to FIGS. 2 and 3, compaction plate 20 has a peripheral edge 21 to which is attached a peripheral wiper seal 22. Referring to FIGS. 1 and 2, it is preferred that compaction plate 20 have a spade-like configuration. The spade-like configuration assists in deflecting the resisting force during compaction movement of compaction plate 20. Referring to FIG. 4, four cable loops 26 are supported by cable guide pulleys 18 and 19. Each of cable loops 26 are connected to cable drive assembly 21. Referring to FIGS. 2 and 3, each of cables 26 has a first end 28 and a second end 30, both of which are secured to compaction plate 20. In order to maintain cables 26 in tension, hydraulic cable tensioners 32 form part of the connection of second end 30 of cables 26 to compaction plate 20. Referring to FIG. 4, cables 26 are secured in a symmetrical pattern to compaction plate 20 with a view to ensuring that each cable 26 provides an equal pulling force upon compaction plate 20. Cable drive assembly 21 includes a pair of cable receiving drums 34 which are mounted on a common shaft 36. Shaft 36 is rotated by a drive motor 38.

The use and operation of compaction mechanism 10 will now be described with reference to FIGS. 1 through 4. Referring to FIG. 4, when compaction is desired drive motor 38 is activated to rotate shaft 36 upon which are mounted drums 34. The rotation of drums 34 results in movement of cable loops 26. In view of the fact that cables 26 form endless loops the rotation of drums 34 do not result in a shortening of cables 26. For each length of cable 26 wound upon drums 34, an equal length of cable 26 is fed from drums 34. During movement cables 26 are supported by cable guide pulleys 18 and 19. Referring to FIGS. 2 and 3, first end 28 and second end 30 of each of cables 26 are secured to compaction plate 20. This means that as cables 26 move, compaction plate 20 is compelled to move. Referring to FIG. 4, cables 26 are secured in a symmetrical pattern to compaction plate 20 with a view to ensuring that each cable 26 provides an equal pulling force upon compaction plate 20. Cables 26 are of equal length and are preferably maintained in tension. If one of cables 26 were to develop slack the pulling force would become uneven. Referring to FIGS. 2 and 3, hydraulic cable tensioners 32 are, therefore, provided to take up any slack, thereby assisting in distributing the pulling force equally between the four cables. During movement of the spade-like configuration of compaction plate 20 deflects any resisting force. Peripheral wiper seal 22 prevents garbage from becoming lodged between a peripheral edge of compaction plate 20 and compaction chamber 12.

The compaction mechanism, as described above, provides a number of secondary benefits. Prior art compaction mechanisms relied upon hydraulic cylinders. Extensive internal reinforcement of the compaction chamber was required in order to mount and withstand the forces exerted by the hydraulic cylinder. This reinforcement took space and diminished the carrying capacity of the garbage truck. In addition, the hydraulic cylinder and associated reinforcement added considerable weight to the garbage truck. In view of weight restrictions on roadways, this additional weight served as another limitation on the load capacity of the garbage truck.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A compaction mechanism for a garbage truck, comprising:
    a cylindrical compaction chamber having a peripheral defining wall, A first end and a second end;
    cable guide means being positioned adjacent each of the first end and the second end of the compaction chamber;
    a free floating compaction plate disposed transversely across the compaction chamber, the compaction plate having a peripheral edge which is spaced from the peripheral defining wall;
    at least two cables extending between the cable guide means at first end and the cable guide means at the second end of the compaction chamber, each of the at least two cables having a first end and a second end both secured to the compaction plate, the at least two cables being secured in a symmetrical pattern whereby each cable provides an equal pulling force upon the compaction plate;
    drive means for concurrently moving the at least two cables to pull the compaction plate toward one of the first end and the second end of the compaction chamber; and
    a one piece peripheral wiper seal completely covering the peripheral edge of the compaction plate in sealing engagement with the peripheral wall of the compaction chamber, such that the wiper seal maintains a barrier to passage of the garbarge upon movement of the compaction plate.

2. The compaction mechanism as defined in claim 1, wherein means are provided for maintaining the at least two cables in tension.

3. The compaction mechanism as defined in claim 1, wherein the compaction plate has a spade-like configuration.

4. The compaction mechanism as defined in claim 1, wherein there are four cables secured to the compaction plate.

5. A compaction mechanism for a garbage truck, comprising:
    a generally cylindrical compaction chamber having a peripheral defining wall, a first end and a second end;
    cable guide pulleys being positioned adjacent each of the first end and the second end of the compaction chamber;
    a free floating compaction plate disposed transversely across the compaction chamber, the compaction plate having a peripheral edge which is spaced from the peripheral defining wall;
    four cables extending between the first end and the second end of the compaction chamber, each of the four cables having a first end and a second end both secured to the compaction plate, the four cables being secured in a symmetrical pattern whereby each cable provides an equal pulling force upon the compaction plate;
    cable tensioners for maintaining each of the four cables in tension;
    drive means for concurrently moving the four cables, thereby causing the compaction plate to move between the first end and the second end of the compaction chamber; and
    a one piece peripheral wiper seal completely covering the peripheral edge of the compaction plate in sealing engagement with the peripheral defining wall of the compaction chamber, such that the wiper seal maintains a barrier to passage of garbarge upon movement of the compaction plate.

6. The compaction mechanism as defined in claim 5, wherein the compaction plate is spade-like.

* * * * *